United States Patent [19]
Kikuchi

[11] Patent Number: 5,841,903
[45] Date of Patent: Nov. 24, 1998

[54] METHOD AND DEVICE FOR EXTRACTING A CONNECTED COMPONENT OF IMAGE DATA

[75] Inventor: Takeshi Kikuchi, Hamamatsu, Japan

[73] Assignee: Yamaha Corporation, Hamamatsu, Japan

[21] Appl. No.: 286,546

[22] Filed: Aug. 5, 1994

Related U.S. Application Data

[63] Continuation-in-part of Ser. No. 4,434, Jan. 14, 1993, abandoned.

[30] Foreign Application Priority Data

Jan. 17, 1992 [JP] Japan .................................. 4-26027

[51] Int. Cl.⁶ ........................................................ G06K 9/46
[52] U.S. Cl. ............................ 382/203; 382/173; 382/202
[58] Field of Search ..................................... 382/177, 179, 382/180, 282, 283, 204, 203, 197, 198, 316; 395/131, 132

[56] References Cited

U.S. PATENT DOCUMENTS

| | | | |
|---|---|---|---|
| 3,593,283 | 7/1971 | Miyamoto et al. | 382/26 |
| 3,899,771 | 8/1975 | Saraga et al. | 340/146.3 |
| 4,183,013 | 1/1980 | Agrawala et al. | 382/173 |
| 4,558,374 | 12/1985 | Kurata et al. | 382/16 |
| 4,624,013 | 11/1986 | Urushibata | 382/9 |
| 4,630,306 | 12/1986 | West et al. | 382/204 |
| 5,113,451 | 5/1992 | Chapman et al. | 382/26 |
| 5,144,682 | 9/1992 | Nakamura | 382/26 |
| 5,199,083 | 3/1993 | Takeda | 382/26 |
| 5,228,097 | 7/1993 | Kumagai | 382/56 |
| 5,305,393 | 4/1994 | Kawai et al. | 382/9 |

OTHER PUBLICATIONS

"Automated Recognition System for Musical Score" Matsushima et al. in Bulletin of Science and Engineering Research Laboratory Waseda University, No. 112 pp. 25–52, 1985.
Hasegawa, J. et al. *Basic Methods of Image Processing*, (English Title: *Image Processing on Personal Computer*), Aug. 10, 1986, title sheet, forward, table of contents, Chapter 1 title page, pp. 14–17 and 44–49, p. 298 of index, and authors' biographies.
Musitek ad from 1993 unnamed publication introducing "MIDISCAN for Windows" Software.

*Primary Examiner*—Leo H. Boudreau
*Assistant Examiner*—Bhavesh Mehta
*Attorney, Agent, or Firm*—Pillsbury Madison & Sutro

[57] ABSTRACT

An image processing device for extracting connected components of image data includes a first image memory for storing image data that contains connected components (e.g., object image data). A processor searches the image data stored in the first image memory to detect a part of the object image data and determines a watching area of the image data in the main rasterizing scan direction on the basis of the detected part of the object image data. The processor then searches the image data to detect a line segment of continuous pixels that is coupled to and includes the watching area. Once, the line segment is detected, the processor cancels the detected line segment from the image data stored in the first image memory and outputs data corresponding to the cancelled line segment. The device also includes a second image memory for storing the detected and cancelled line segment outputted by the processor as a connected component of the image data.

38 Claims, 10 Drawing Sheets

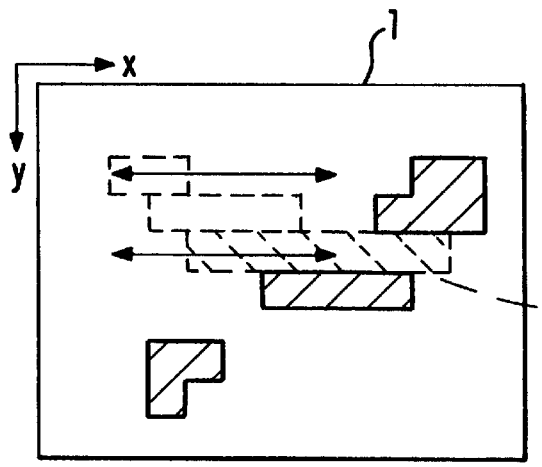
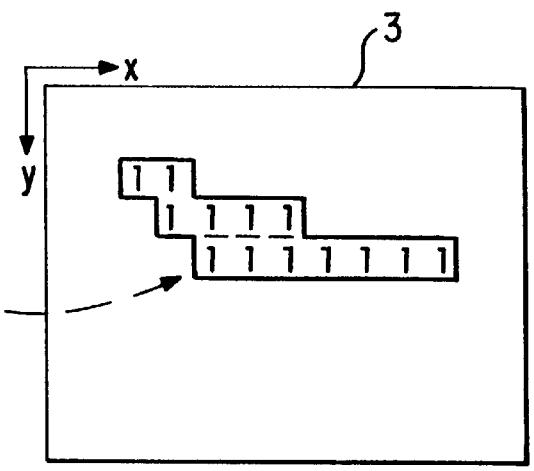
FIG. 6A  FIG. 6B
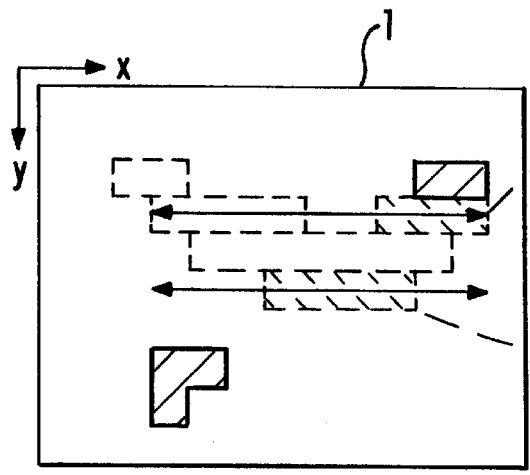
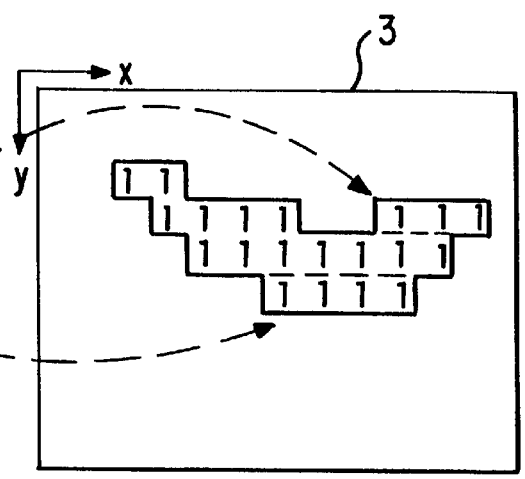
FIG. 6C  FIG. 6D
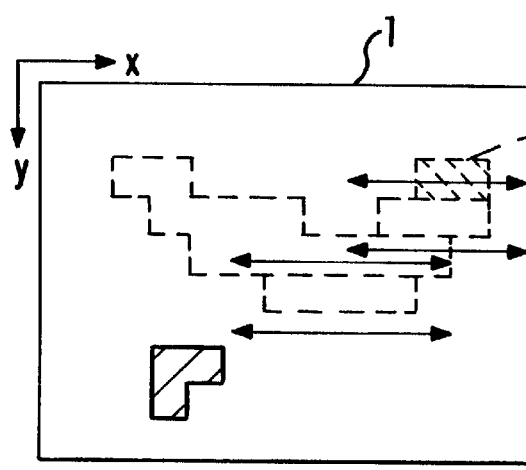
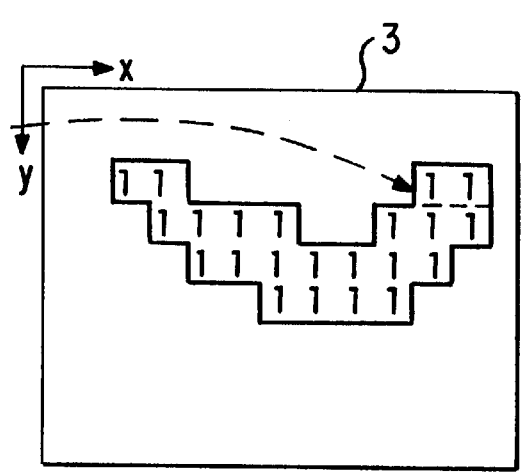
FIG. 6E  FIG. 6F

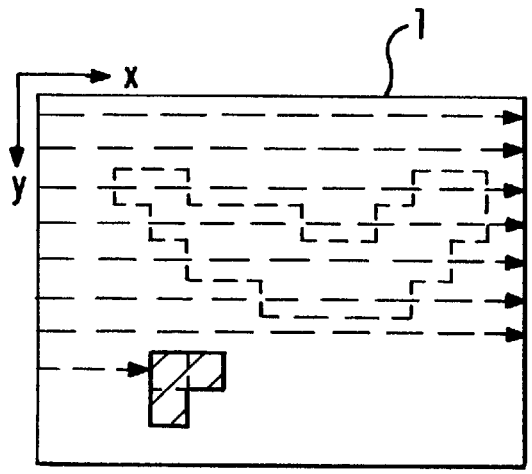
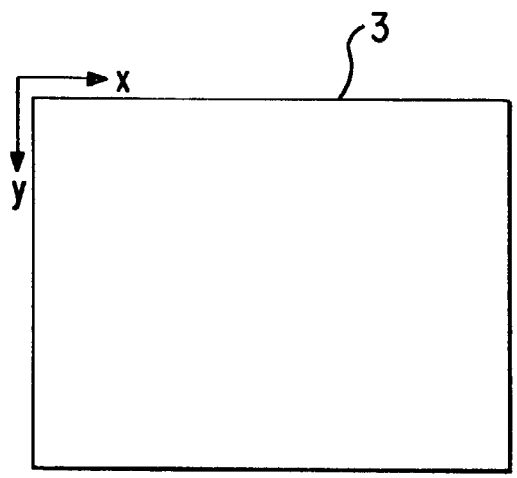
FIG. 8A
FIG. 8B
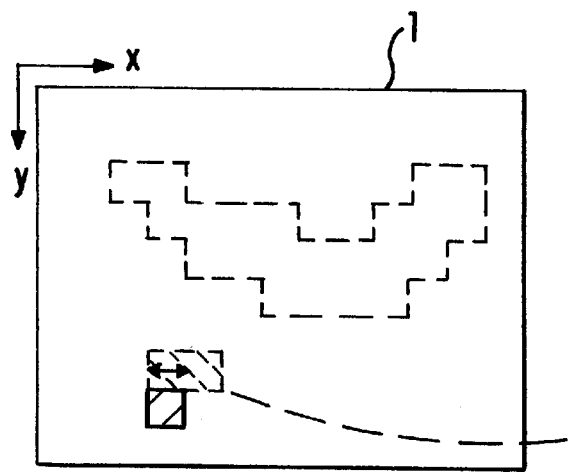
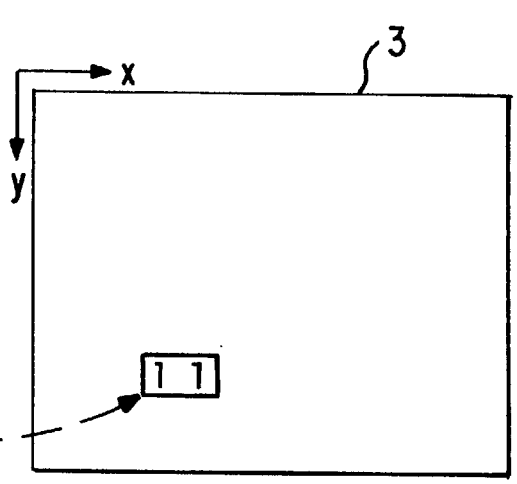
FIG. 8C
FIG. 8D
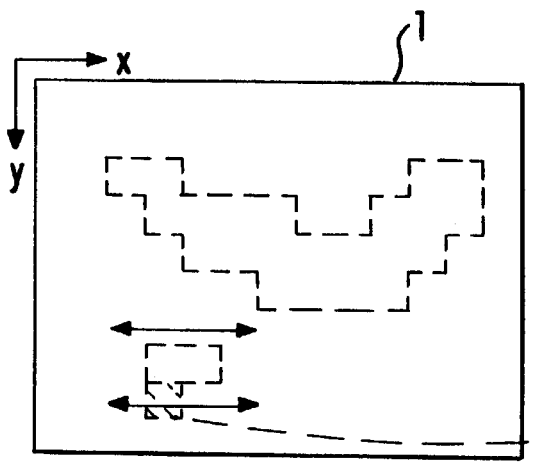
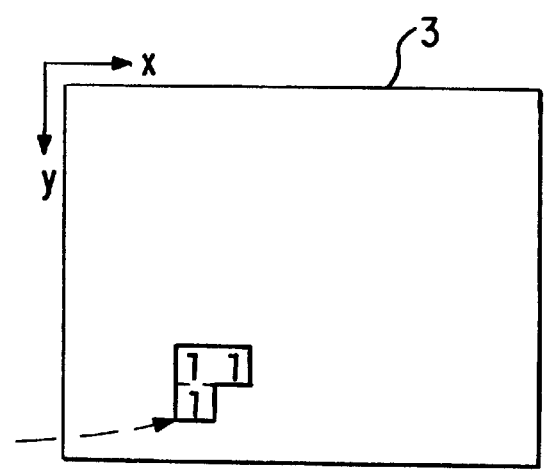
FIG. 8E
FIG. 8F

METHOD AND DEVICE FOR EXTRACTING A CONNECTED COMPONENT OF IMAGE DATA

RELATED APPLICATIONS

This is a continuation-in-part of U.S. patent application Ser. No. 08/004,434 filed on Jan. 14, 1993, now abandoned.

FIELD OF THE INVENTION

This invention relates to a device and method for extracting a connected component of image data. In particular, the device and method extract a connected component of pixels from information of each object image by lines of pixels to be processed in various image processes, such as pattern recognition, character recognition and image analysis.

BACKGROUND OF THE INVENTION

In conventional processing for extracting a connected component of pixels, a connected component is extracted pixel by pixel while searching a storage region of an image memory in a main rasterizing scan direction. Successive processing is performed, consisting of labelling a detected pixel (e.g., a black pixel) having an object level for detection, and confirming the identity of the label for a continuous portion. More specifically, by searching the image memory in the main scanning direction, black pixels existing at four or eight points adjacent to a detected (e.g., watched) individual black pixel are successively detected and the detected black pixels are then labelled with the same label. Upon confirmation of a plurality continuous areas affixed with different labels, processing for integrating labels (i.e., relabelling) is performed.

In conventional processing for extracting a connected component, masking processing is necessary for confirming a continuity relationship between the detected pixel and the adjacent pixels. In a case where a binary image is stored in an image memory, it is often customary to store a total eight pixels in the main scanning direction of the image as one byte of image data. Accordingly, conventional processing based on a single bit unit requires a complicated computation for identifying a memory address of a black pixel adjacent to the detected pixel and the bit position in the one byte of image data identified by this address. Therefore, conventional processing requires considerable computation time for each step of the successive processing.

In conventional processing for extracting a connected component, each pixel is labelled and the identity of the labels affixed on adjacent pixels is examined. Therefore, sufficient memory is required for storing labels that has a capacity equivalent to the number of total pixels of one image multiplied by the bit number of the label. Moreover, since relabelling is performed during the integration of the labels, an additional memory is also required for storing the identity of the label.

It is an object of the present invention to solve the above described problems of the conventional processing and to provide a device for extracting a connected component of image data which is capable of performing the extracting operation at a higher speed, without requiring extra memories.

SUMMARY OF THE INVENTION

An image processing device according to an embodiment of the present invention for achieving the above described objects of the invention includes a first image memory for storing image data that containing connected components (e.g., object image data). A processor searches the image data stored in the first image memory to detect a part of the object image data and determines a watching area of the image data in the main rasterizing scan direction on the basis of the detected part of the object image data. The processor then searches the image data to detect a line segment of continuous pixels that is coupled to and includes the watching area. Once, the line segment is detected, the processor cancels the detected line segment from the image data stored in the first image memory and outputs data corresponding to the cancelled line segment. The device also includes a second image memory for storing the detected and cancelled line segment outputted by the processor as a connected component of the image data.

According to an embodiment of the present invention, the first image memory is searched to detect a part of the object image data (e.g., a pixel which constitutes a part of the object image), and the first detected pixel is set as a watching area. Then, a line extending in the main rasterizing scanning direction beings with and is extended from this watching area. A line segment of the line that includes the detected pixel and any adjacent continuous pixels along the main rasterizing scan that are a part of the image component is determined. Once the line segment of continuous adjacent pixels is determined, the line segment is cancelled from the first image memory and written into the second image memory. Processing continues and an area adjacent (i.e., above and below in the sub-scanning direction) to the segment of a line cancelled from the first image memory is set as the next watching area. Then a line is extended along the main rasterizing scan direction that includes the new watching area, and this line is searched to find continuous adjacent pixels that form line segments along the main rasterizing scan direction, and which form a part of the continuous component of the image data. Once, the line segments are determined, the newly detected line segments are cancelled and written into the second memory. After which, new working areas (e.g., above and below the previous working area in the sub-scanning direction) are determined on the newly cancelled line segments along the main rasterizing scan direction. This processing is repeated until line segments containing pixels having a particular state (i.e., the state of pixels forming the connected component) cease to be detected by successively renewing the watching area. As a result, a connected component in the image data which was first detected by the processing is cancelled in its entirety from the first image memory and written in the second image memory.

Since, according to embodiment of the present invention, both the watching area and the line segments in the main rasterizing scan direction are an area and a segment of a line that extend in the main rasterizing scan direction, high speed access to the components contained in image memory can be achieved. For example, bit shift processing and ANDing processing only can be used, so that the search processing can be made at a much higher speed than in conventional masking processing searching for pixels adjacent to the watched pixel.

In conventional extracting processing, a plurality of connected components are detected simultaneously by a single search which necessitates the individual labelling of individually detected pixels for confirming the identity of the connected components. On the other hand, in embodiments of the present invention, a single connected component is detected by a series of line by line searches, and the detected single connected component is transferred from the first image memory to the second image memory upon detection. Accordingly, individual labelling of individually detected pixels is unnecessary. Thus, according to embodiments of the present invention, it possible to utilize a second image memory that only has the same capacity as the first image memory and no other memory is required.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

FIGS. 6A to 6F are diagrams for explaining operation of the embodiment of FIG. 1;

FIGS. 8A to 8F are diagrams for explaining operation of the embodiment of FIG. 1;

DESCRIPTION OF PREFERRED EMBODIMENTS

Figure 1:
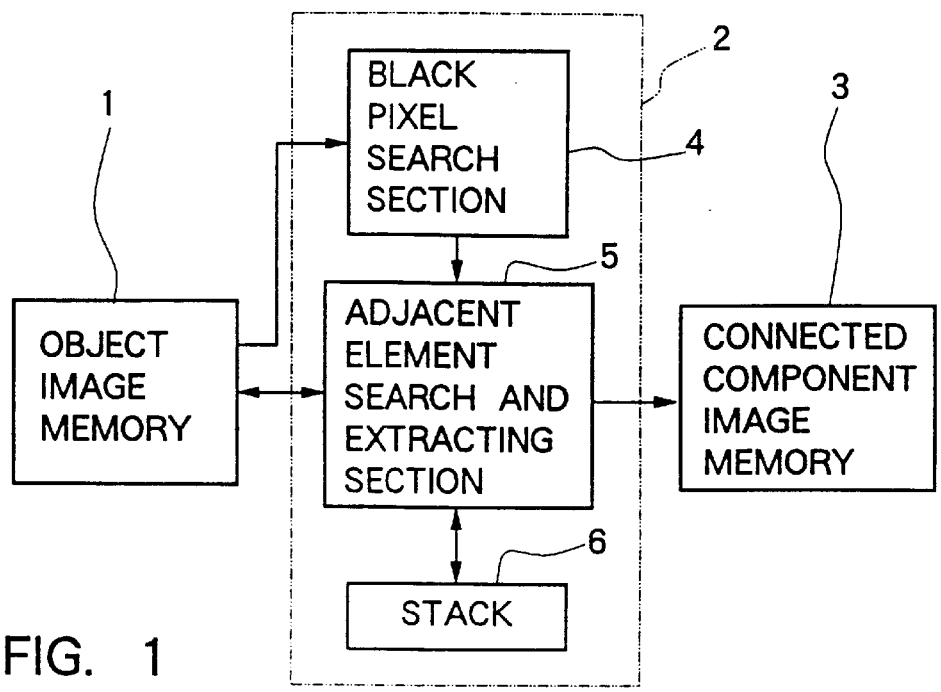
FIG. 1 is a block diagram showing a device according to an embodiment of the present invention for extracting a connected component of binary image data.

Referring first to FIG. 1, a device according to an embodiment of the present invention for extracting a connected component of binary image data includes an object image memory 1, a connected component search section 2 and a connected component image memory 3. The object image memory 1 includes a first image memory for storing the binary image data to be processed. The connected component search section 2 detects a part of a connected component, such as a black pixel (i.e., a pixel of data "1"), from the object image memory 1. One a connected component is detected, it is cancelled from the object image memory 1 and written into the connected component image memory 3. The connected component image memory 3 constitutes the second image memory for storing the connected component detected from the object image memory 1 by the connected component search section 2.

In preferred embodiments, the connected component search section 2 may be implemented by software; however, alternative embodiments may be implemented with hardware or a combination of hardware and software. In preferred embodiment, the processing is performed on memory modules, such as video RAMs or the like. Also, the preferred embodiments, uses two separate memory modules and two separate processors. However, alternative embodiments, may utilize different locations in a single memory module and a single processor, such as a personal computer, data processor or the like, may be used. In preferred embodiment, the search and detection is based on pixels having binary values (i.e., 1 or zero) and the description below is based on a binary image. However, alternative embodiments, may search and detect pixels having gray scale values.

The connected component search section 2 includes a black pixel search section 4, an adjacent element search and extracting section 5, and a stack 6.

The black pixel search section 4 starts a search of the object image memory 1 at an initial starting address in the object image memory 1 and begins scanning in the main rasterizing scan direction to detect a first occurring black pixel that is part of a connected component, and then defines this black pixel as a first watching area. The first watching area is based on the first initial search and is only one pixel in size.

Figure 9:
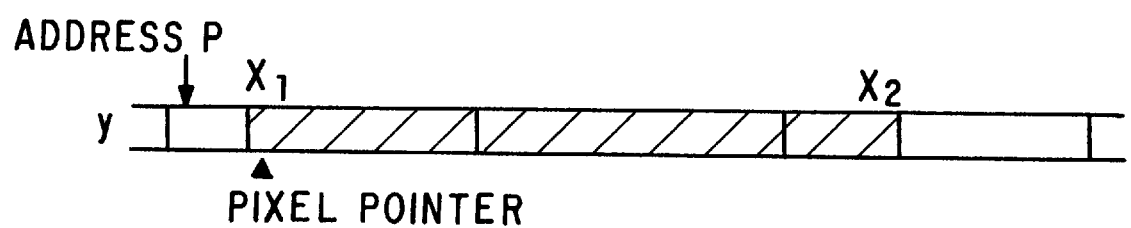
FIG. 9 is a diagram for explaining operation of the embodiment of FIG. 1.
Figure 10:
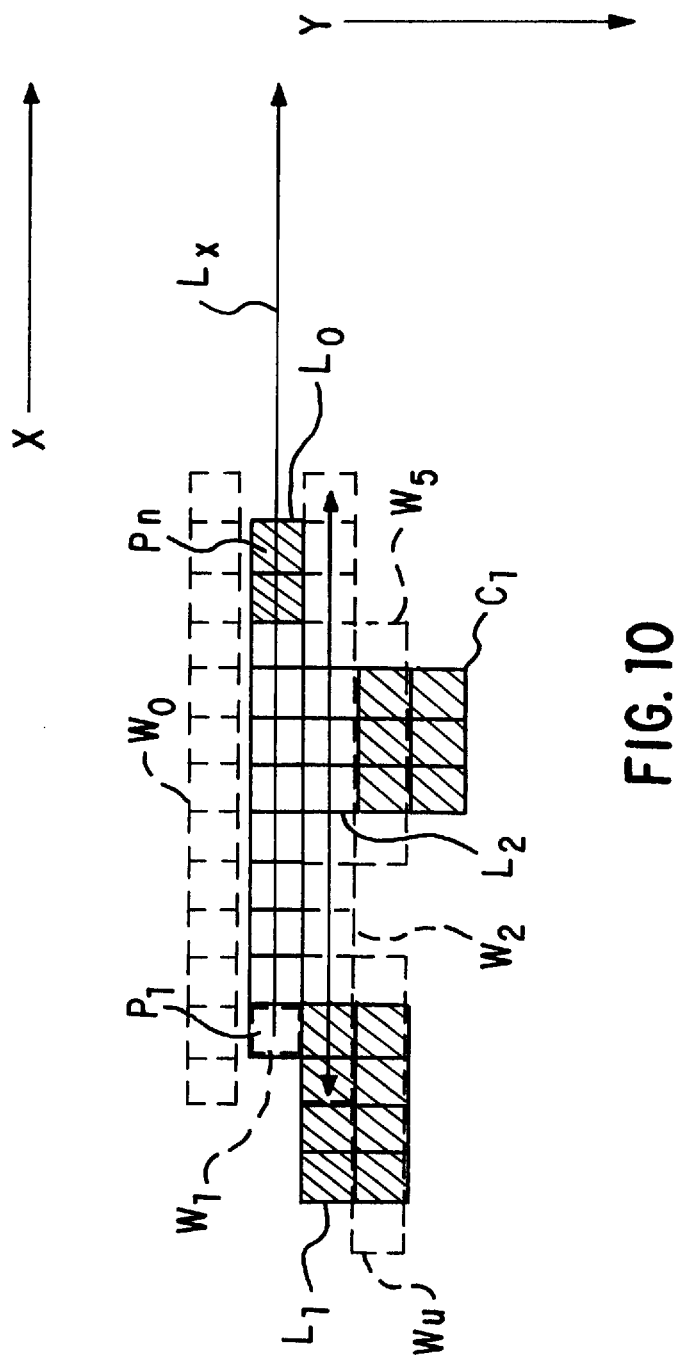
FIG. 10 is a diagram for explaining the operation of the embodiment of FIG. 1.

As shown in FIG. 10, the first detected pixel $P_1$ corresponds to the first watch area $W_1$ (shown as a dashed lines). A line $L_x$, including pixel $P_1$, is then extended from pixel $P_1$ along the direction of the main rasterizing scan direction (shown as X in FIGS. 2 and 5–10), and a search is conducted by the adjacent element search and extracting section 5 along the line $L_x$ to identify and form a line segment $L_0$ ending with a last black pixel $P_n$ along line Lx. When the line segment $L_0$ has been identified, the line segment $L_0$ is canceled from the object image memory 1 and written into the connected component image memory 3. New watch areas are then formed that are adjacent to and above or below the just cancelled line segment $L_0$ (i.e., in the sub-scanning direction -shown as Y in FIGS. 2 and 5–10), and thus two new watch areas, $W_\phi$ and $W_2$ (shown in dashed lines), are formed to detect pixels attached to the connected component $C_1$. These new watch areas $W_\phi$ and $W_2$ are stored in the stack 6 for processing by the adjacent element search and extracting circuit 5. The work areas are processed in sequence, and may be handled on a last-in, first-out basis, a first-in, first-out basis or the like until all work areas are searched for adjacent black pixels.

Since, in FIG. 10, the detected pixels are assumed to have the possibility of up to 8 adjacent black pixels (see FIG. 2B) the watch areas must be formed to account for this possibility. Therefore, watch area $W_\phi$ is formed one level above (i.e., Y-1) the sub-scanning level (i.e., Y) for the previous line segment $L_0$. Also, the length of watch area $W_\phi$ is set to extend from pixel $P_1$-1 to pixel $P_n$+1 to account for the possibility of adjacent diagonal black pixels being connected to pixels $P_1$ and $P_n$. Watch area $W_2$ is formed one level below (i.e., Y+1) the sub-scanning level for the previous line segment $L_0$, and the length extends from pixel $P_1$-1 to pixel $P_n$+1, like watch area $W_\phi$.

As shown in FIG. 10, there are no connected pixels above the line segment $L_0$ extending from $P_1$ to $P_n$, and therefore, the watch area $W_\phi$, formed above the cancelled line segment $L_0$, is found to contain no black pixels and no further line segments or watch areas are formed based on the watch area $W_\phi$. However, the watch area $W_2$ formed below the canceled line segment $L_0$ does contain black pixels that are attached to line segments $L_1$ and $L_2$ of the connected component $C_1$. The adjacent element search and extracting section 5 searches the watch area $W_2$ and determines that pixels of line segments $L_1$ and $L_2$ are contained within watch area $W_2$ and thus are attached to the connected component $C_1$. The section 5, then searches the watch areas $W_2$ from the detected pixels to form line segments $L_1$ and $L_2$. Once the line segments $L_1$ and $L_2$ are identified, they are canceled from the object image memory 1 and written into the connected component image memory.

New watch areas would then be formed above and below each line segment $L_1$ and $L_2$ to search for additional portions of the connected component $C_1$. FIG. 10, only shows new watch areas $W_4$ and $W_5$ (shown in dashed lines) that would be formed one sub-scanning level below line segments $L_1$ and $L_2$. However, it should be understood that two corresponding watch areas would also be formed above the line segments $L_1$ and $L_2$, but these are not illustrated in FIG. 10 to simplify the drawing. These new watch areas would be loaded into stack 6 to be processed in sequence to find additional portions of the connected component $C_1$.

Figure 2A:
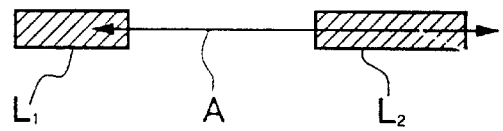
FIGS. 2A to 2C are diagrams for explaining the function of an adjacent element search and extracting section in the embodiment of FIG. 1.

As described above, the adjacent element search and extracting section 5 searches for line segments $L_1$ and $L_2$, each of which has at least one black pixel extending in the main rasterizing scan direction (i.e., rightwardly from the left as viewed in the figure along the x axis). As shown in FIG. 2A, at least a part of each line segment $L_1$ and $L_2$ is within a watching area A as shown in FIG. 2A (hereinafter referred to as the "line segment coupled to the watching area"). The adjacent element search and extracting section 5 cancels the detected line segments from the object image memory 1 and writes them into the connected component image memory 3. Thus, the adjacent element search and extracting section 5 executes the following processing steps:

(i) detecting a line segment at least part of which is included in a watching area;

(ii) cancelling this line segment; and (iii) storing this segment in the second memory after defining a pixel areas adjacent to the detected line segment as the next watching areas. Upon determination of a watching area, the contents of the stack 6 are renewed and a new watching area is written in the stack 6. This processing is repeated until a segment of a line ceases to be detected.

Figure 2B:
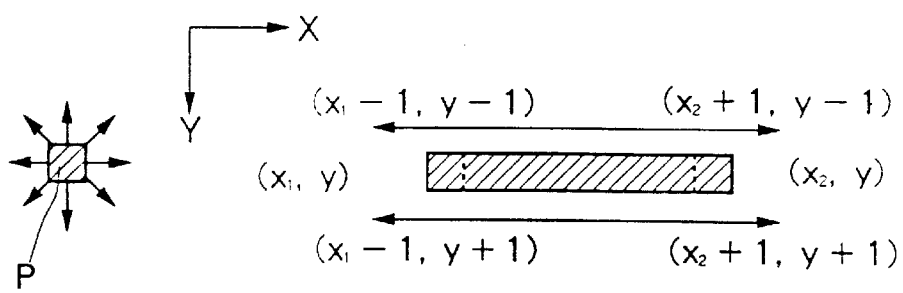

After the initial detected black pixel, subsequent working areas can include more than one pixel. For example, if an area of connection can extend over eight adjacent pixels with respect to a watched pixel P (as shown in FIG. 2B), the new working areas (designated by the arrows in FIG. 2B) are formed above (i.e. Y-1) and below (i.e., Y+1) the current sub-scanning level Y. The working areas extend from one pixel in back (i.e., $X_1$-1) of the first pixel $X_1$ in the previous line segment (i.e., extending from pixel $X_1$ to $X_2$ at sub-scanning level Y) to one pixel beyond (i.e., $X_2$+1) the last pixel $X_2$ in the previous line segment to account for potential pixels being diagonally attached to the connected component at the ends of the previous line segment. Thus, one watch area extends from pixel ($X_1$-1, Y-1) to pixel ($X_2$+1, Y-1), and the other watch area extend from pixel ($X_1$-1, Y+1) to ($X_2$+1, Y+1) which are adjacent to the previously detected and cancelled line segment extending from pixel ($X_1$, Y) to pixel ($X_2$, Y) in the sub-scanning direction Y.

Figure 2C:
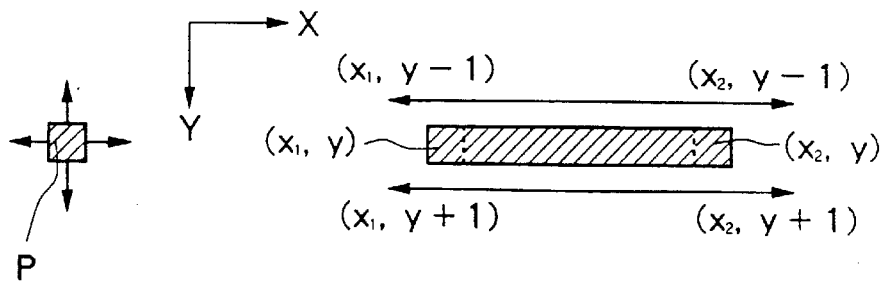
Figure 3:
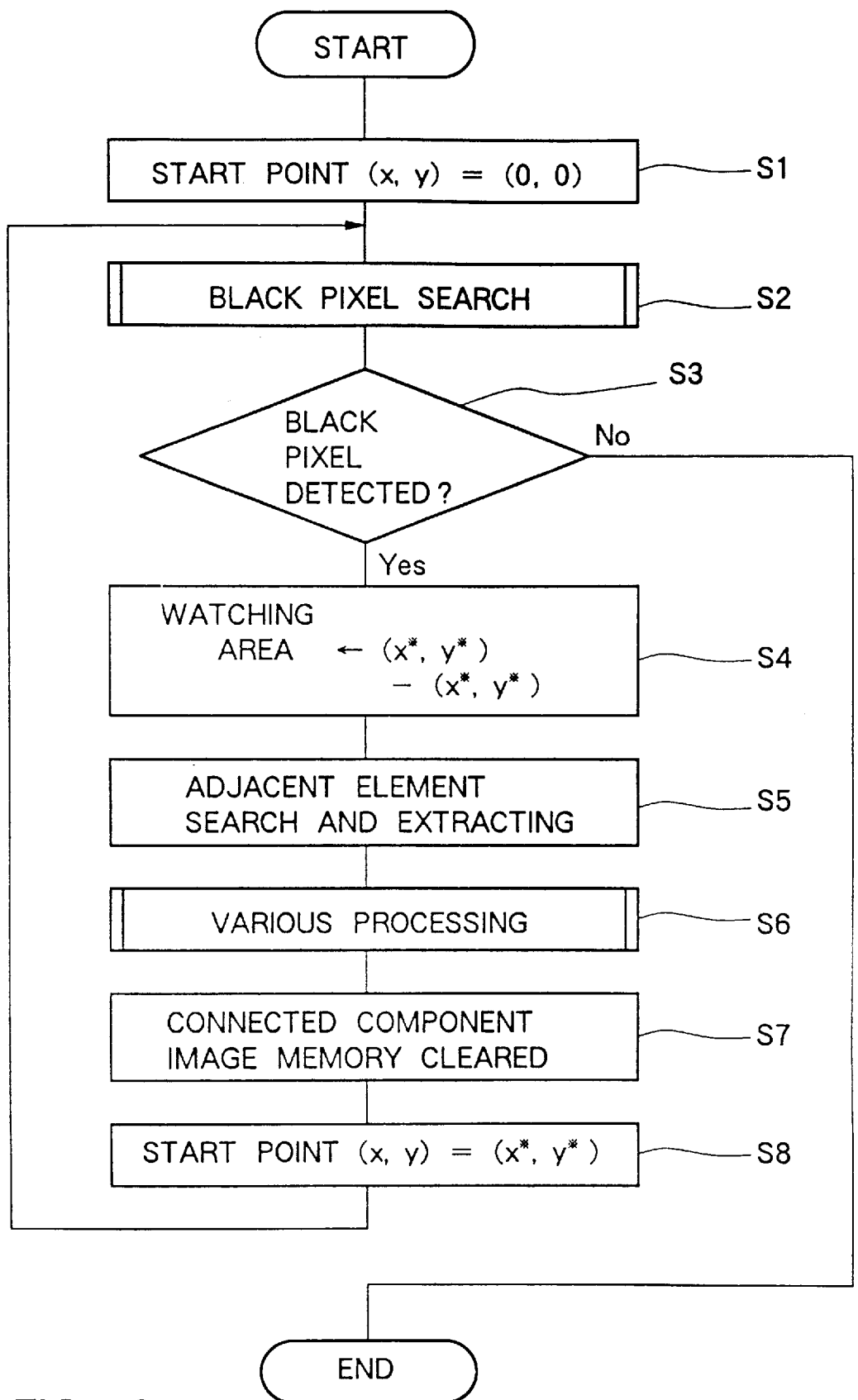
FIG. 3 is a main flow chart showing a connected component extracting processing performed by the embodiment of FIG. 1.

In another example, if an area of connection extends over only four adjacent pixels with respect to a watched pixel P (as shown in FIG. 2C), the two work areas (designated by the arrows in FIG. 2C) extend from pixel ($X_1$, Y-1) to pixel ($X_2$, Y-1) and pixel ($X_1$, Y+1) to pixel ($X_2$, Y+1) which are adjacent to the detected line segment extending from pixel ($X_1$, Y) to pixel ($X_2$, Y) in the sub-scanning direction Y. In this case, since no diagonally connected pixels are expected, the work areas do not extend in back of and beyond the previous line segment The following description of embodiments of the present invention will be made on the assumption that the range of connection extends over eight adjacent pixels. The operation of the connected component extraction device will now be described. Referring to FIG. 3, a starting point (X, Y) for the processing is set at (0, 0) (S1).

Figure 5A:
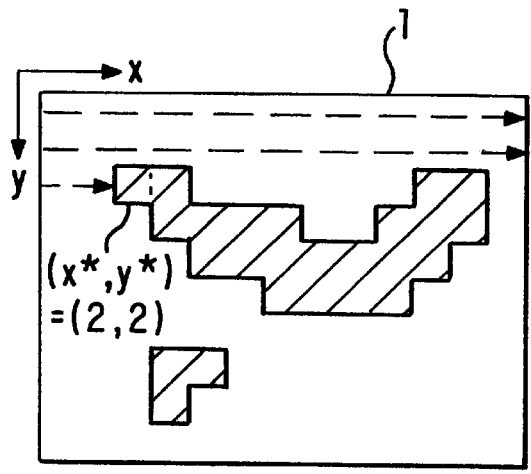
FIGS. 5A to 5F are diagrams for explaining operation of the embodiment of FIG. 1.

The operation of the black pixel search section 4 is started and the black pixel search processing is thereby executed (S2). By this processing, as shown in FIG. 5A, the object image memory 1 is searched from address (0, 0) in the main rasterizing scan direction (X direction) to detect a first occurring black pixel (X*, Y*) that is shown at (2, 2) in FIG. 5A. If no black pixel is detected by this processing (i.e., the full object image memory has been scanned, the connected component extracting processing is ended (S3 of FIG. 3). Upon detection of a black pixel by the black pixel search processing, this black pixel, (2, 2), is established as the first watching area (S4).

Figure 4:
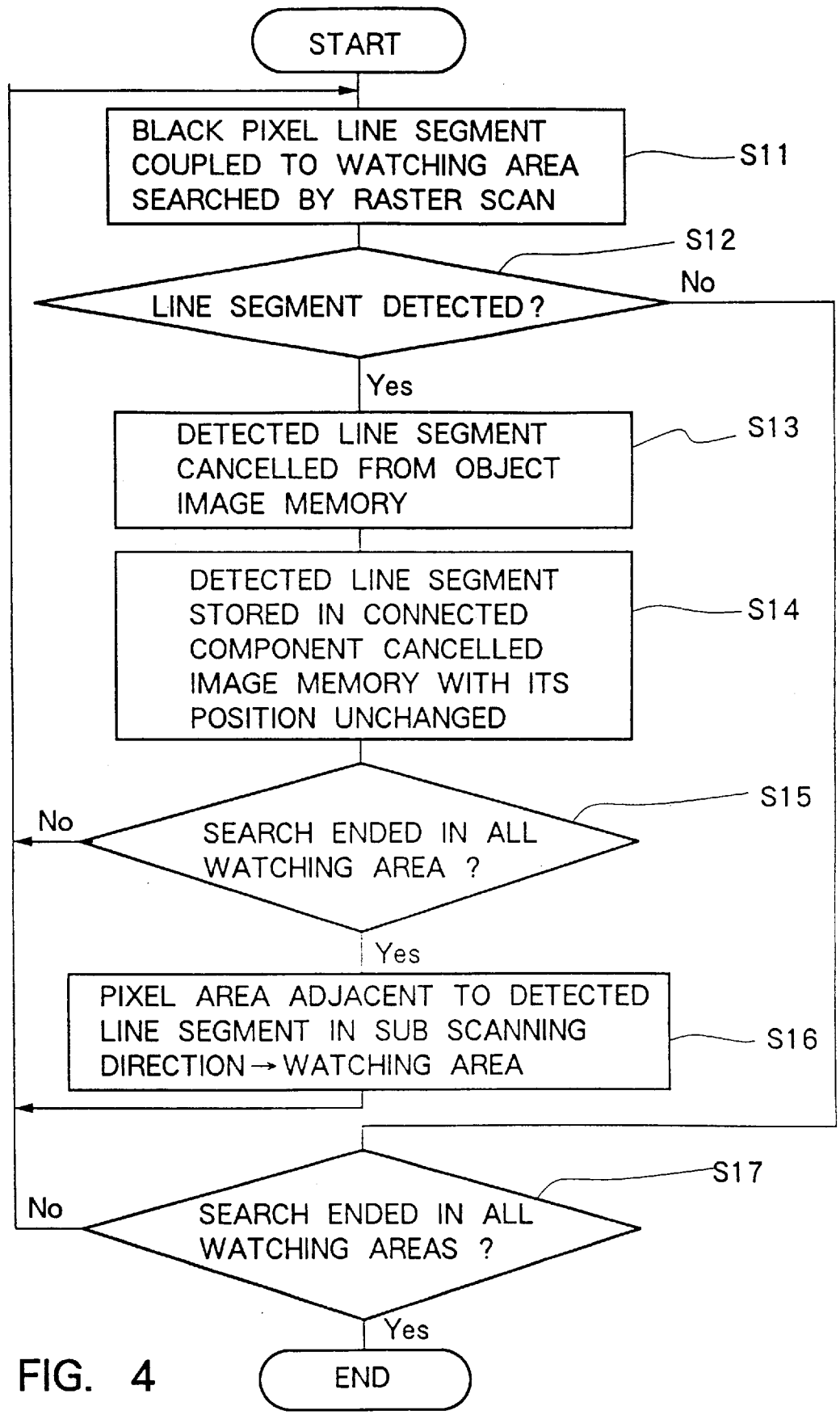
FIG. 4 is a flow chart showing adjacent element search and extracting processing in the same processing of FIG. 3.
Figure 5B:
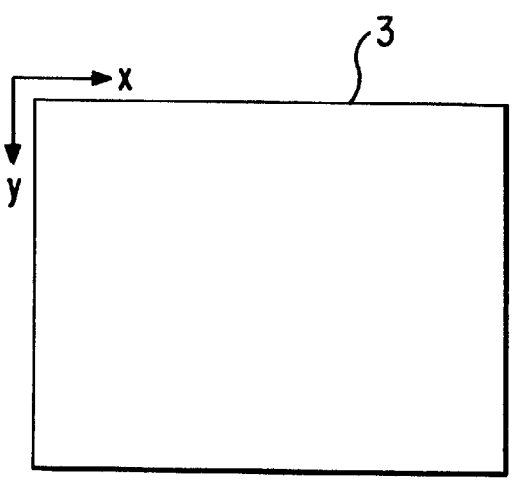

Then, the operation of the adjacent element search and extracting section 5 is begun to process and extract adjacent elements (S5). As shown in FIG. 4, a black pixel line segment coupled to a line segment (a part of which is included in the watching area) is searched for by raster scan in the main rasterizing scan direction X (S11). In the example of FIG. 5A in which the watching range A extends from pixel (2, 2) to pixel (2, 2) (i.e., the watching area A is a single pixel), image data attached to pixel (2, 2) and which is along a line in the main rasterizing scan direction X is searched. If no line segment is detected in the watching area (S12), the same processing is executed with respect to any other watching areas that are stacked in the stack 6, and if no further detection of a line segment is made, a series of connected components are deemed to have all been extracted and the processing is ended (S17). Since, in this example, a line segment extending from pixel (2, 2) to pixel (3, 2) is stored in the object image memory 1, this line segment is detected (see FIG. 5B). Upon detection of the line segment, as shown in FIG. 5B, the detected line segment is cancelled from the object image memory 1 (S13) and it is written in the connected component image memory 3 while its position is maintained unchanged (S14).

Figure 5C:
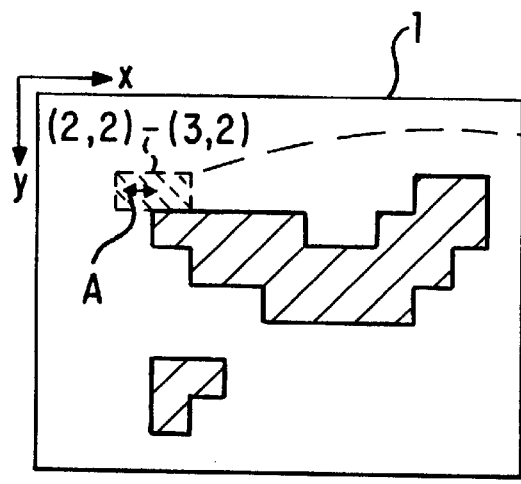
Figure 5D:
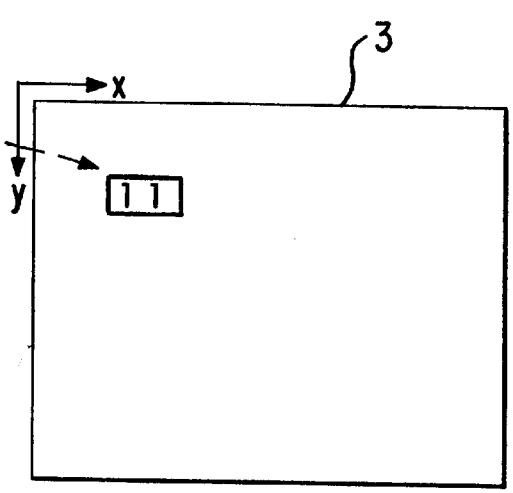
Figure 5E:
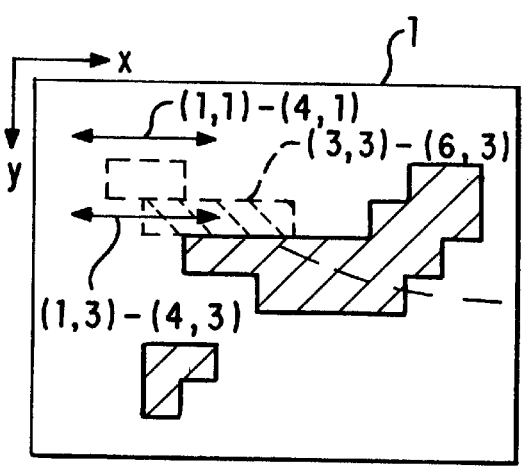
Figure 5F:
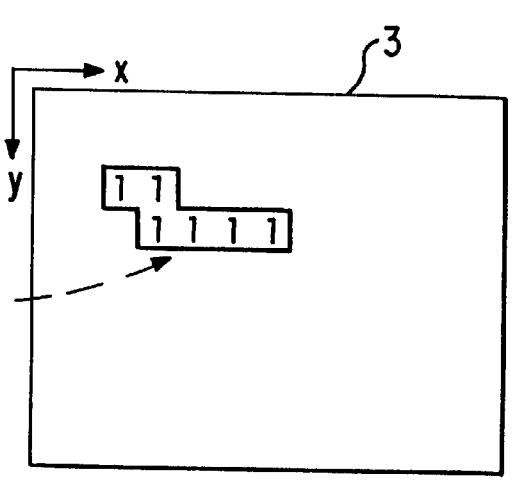

Upon finishing the search with respect to other watching areas stacked in the stack 6, the same processing is executed by adopting areas adjacent to the detected line segment in the sub-scanning direction (i.e., shown as Y in FIG. 5) as the next watching areas (S15). In the example of FIG. 5C, a first pixel range extending from pixel (1, 1) to pixel (4, 1) and second pixel range extending from pixel (1, 3) to pixel (4, 3) adjacent to the previous detected line segment, extending from pixel (2, 2) to pixel (3, 2) are stored in the stack 6 as the next watching areas (S16).

By searching for a black pixel line segment coupled to a next watching area by raster scanning in the same manner as described above, a line segment extending from pixel (3, 3) to pixel (6, 3) is detected, as shown in FIG. 5C. This line segment is also cancelled from the object image memory 1 and written in the connected component image memory 3 while its position is maintained unchanged. By repeating this processing, as shown and illustrated in FIGS. 6A, 6B, 6C and 7, all line segments constituting one connected component are cancelled from the object image memory 1 and written in the connected component image memory 3. When adjacent line segments ceased to be detected as shown in FIG. 7, the adjacent element search and extracting processing is ended (S12, S17).

Figures 7A, 7B:
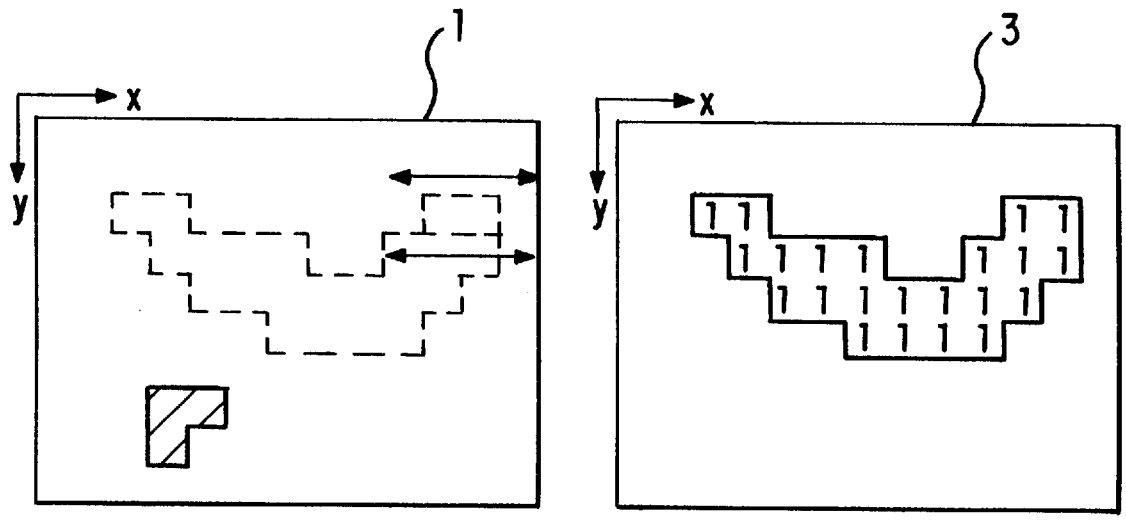
FIG. 7 is a diagram for explaining operation of the embodiment of FIG. 1.

Once, the connected component has been transferred to the connected component image memory, as shown in FIG. 7, further processing, such as character recognition or the like, is applied to the image data in a square covering the extracted and transferred image data that represents the connected component that was shifted to the connected component image memory 3 (S6 of FIG. 3). After further processing of the extracted image data is completed, the contents of the connected component image memory 3 are cleared (S7).

Then in S8, a next starting point is changed to a new black pixel detection point (X*, Y*). As shown in FIG. 8A, the first black pixel is located at point (3, 7), and the black pixel search processing is executed again (S2) until pixel (3, 7) is detected. By this operation, a next connected component is extracted as shown in FIGS. 8A to 8C.

In alternative embodiments, image data may be stored as eight bits (eight pixels) that form one byte of image data per one address in the image memories 1 and 3. The addresses are used to access the image memories 1 and 3, and can be utilized to extract the image data making up a connected component in a manner similar to that described above.

In these alternative embodiments, processing is carried out as follows. Assuming that a watching area extends from pixel $(X_1, Y)$ to pixel $(X_2, Y)$ as shown in FIG. 9. The object image memory 1 is searched for a pixel value by scanning from pixel $(X_1, Y)$ to pixel $(X_2, Y)$ using a pixel pointer. A pixel pointer indicating a currently watched pixel is realized by the following two variables:

(1) Byte Pointer: a pointer indicating a byte at which the pixel pointer is located.

(2) And Bit: an 8-bit number in which a pixel indicated by the pixel pointer only is 1 and the rest are 0.

In the example of FIG. 9, the Byte Pointer and the And Bit are respectively set as follows during the initial setting:

Byte Pointer =P, And Bit =00100000

These pointers can be set from the value $(X_1, Y)$. An algorithm for advancing the pixel pointer rightwardly by 1 is as follows:

If (And Bit & 1) (when And Bit is 00000001)

Increment Byte Pointer

And Bit=10000000 else

Shift And Bit rightward

A pixel value is examined by performing this scanning and ANDing a byte value indicated by the Byte Pointer and the And Bit.

A pixel at which the result of ANDing (the pixel value) is "1" is determined as a part of a line segment coupled to the watching area and written in the connected component image memory 3. Thus, high speed processing can thereby be realized using memory addresses that hold the data for eight pixels as a single byte.

Figure 11:
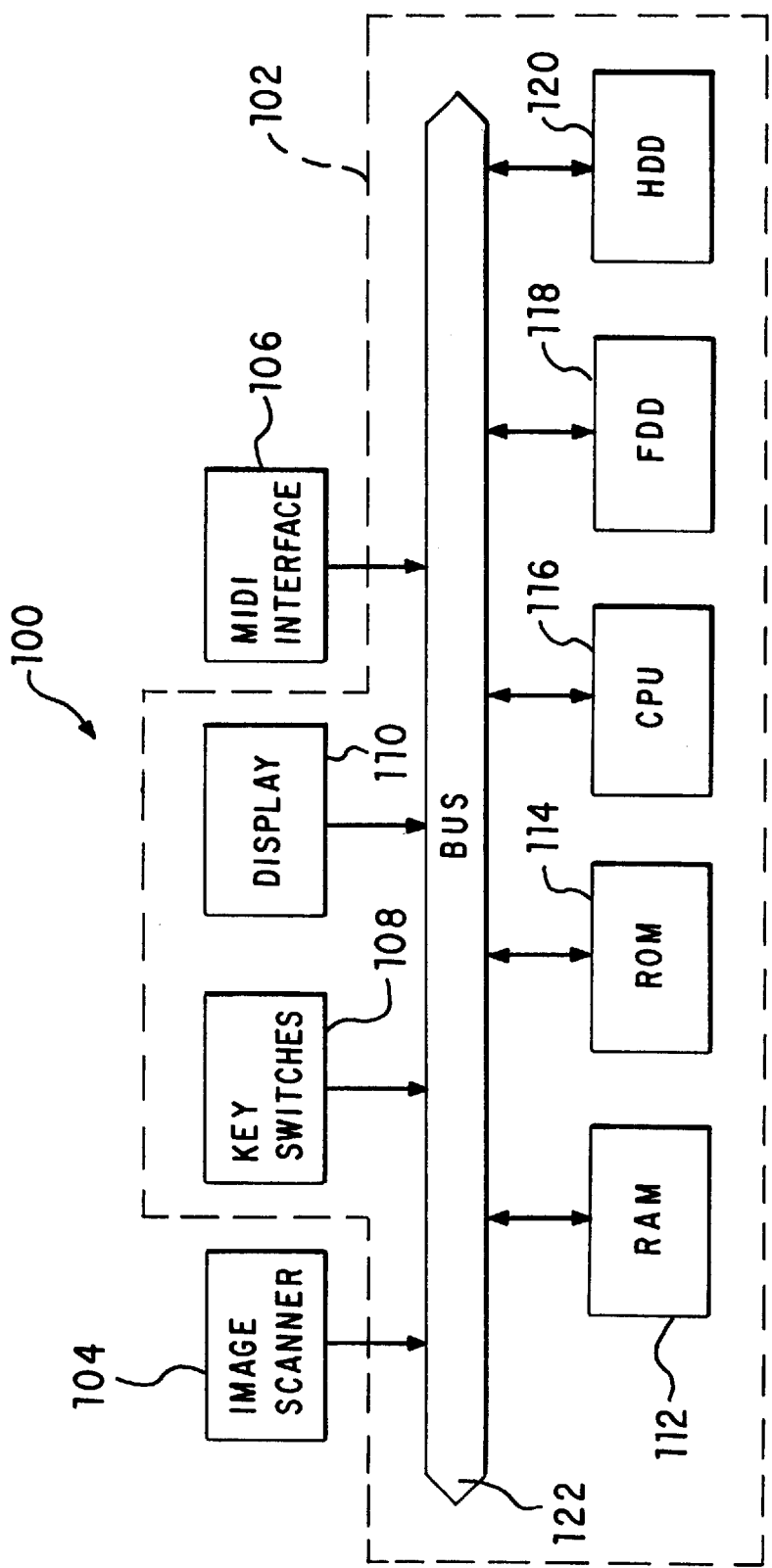
FIG. 11 is a system block diagram of a device according to a second embodiment of the present invention for extracting a connected component of binary image data.

A device 100 in accordance with a second embodiment of the present invention is illustrated in FIGS. 11 and 12. The device 100 is for use in systems that scan in musical manuscripts or the like and then transform them into MIDI files. The device 100 includes a personal computer (PC) 102, an image scanner 104 and a MIDI interface 106. The image scanner 104 is coupled to the PC 102 via cables, or the like, and is used to input an image for processing by the PC 102. The PC 102 is coupled to a MIDI interface 104 to operatively connect and output MIDI data to devices that utilize MIDI data.

The PC 102 includes key switches 108 and a display 110. The key switches are used to input data and commands to the PC 102 via a data bus 122, and the display 110 is used to visually observe data and the results of the image extracting processing. The PC 102 also includes a RAM 112, a ROM 114, a CPU 116, a floppy disk drive (FDD) 118 and a hard disk drive (HDD) 120 all connected via the data bus 122. The RAM 112 is used to store the object image data and the extracted image data, as shown in FIG. 12(C). The RAM 112 is also used to temporarily hold data used by the CPU 116. The ROM 114 contains the program instructions for running the CPU 116 and PC 102; however, in alternative embodiments, it may also contain program instructions for performing the image data extraction processing described above. The CPU 116 is utilized to run the PC 102 and process the image data contained in the RAM 112. The image data may also be inputted and/or outputted through either the FDD 118 or the HDD 120.

Figure 12A:
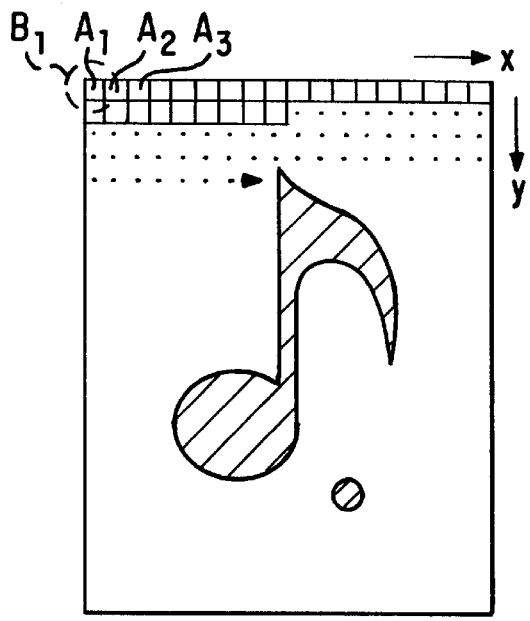
FIGS. 12A–12C are diagrams explaining the operation of the embodiment of FIG. 11.
Figure 12B:
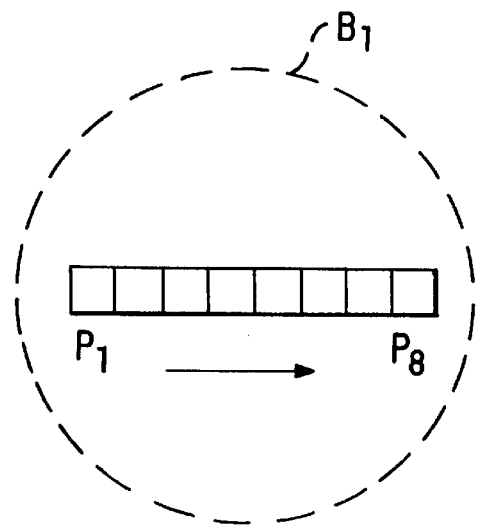
Figure 12C:
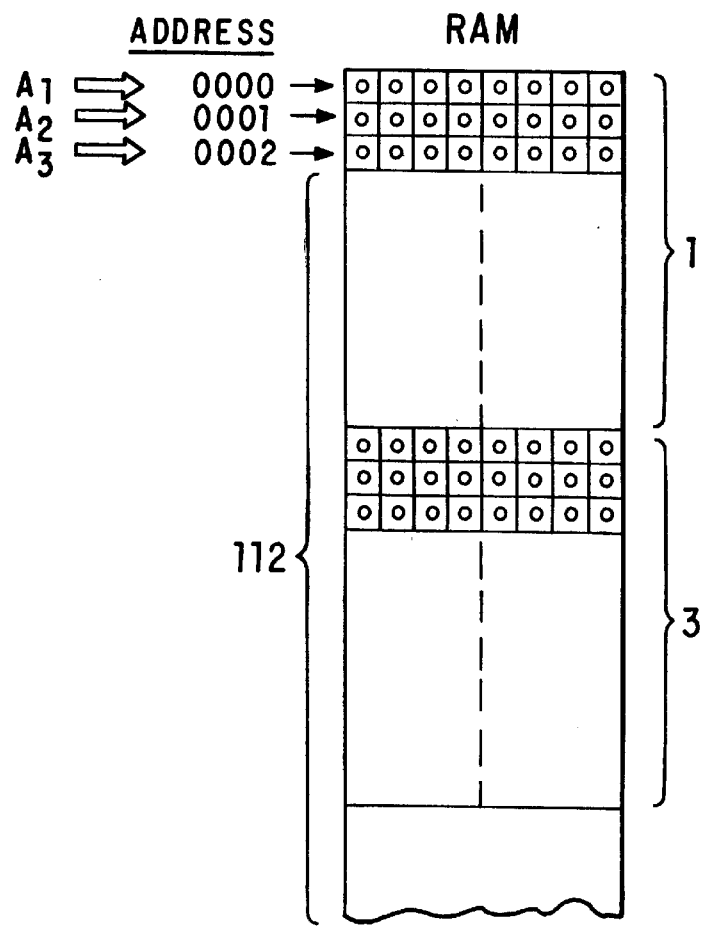

Operation of the embodiment shown in FIG. 11, is illustrated in FIGS. 12A to 12C. The device 100 scans the object image data memory 1 contained in a portion of the RAM 112 of the PC 102. The RAM 112 is accessed one address at a time to scan across the image data along a main rasterizing scanning direction X, as shown in FIG. 12A. Each address location of the RAM 112 contains 1 byte of data representing the pixel values of eight adjacent pixels along the main rasterizing scan direction X. The device 100 utilizes the pixel pointer technique described above and illustrated in FIG. 9 to quickly find a first detected black pixel, because each byte in the image data (such as shown at B1 in FIG. 12A and 12B) includes eight pixels. Once the first black pixel is detected, a first working area is established and a connected component (shown as a note in FIG. 12A) is extracted and transferred as described above. The process continues until all of the connected components contained in the object image memory portion 1 of the RAM 112 have been extracted and transferred one at a time to the connected component image memory.

In preferred embodiments, each extracted connected component is identified by character recognition processing, or the like, to produce musical notes that can then be converted in to MIDI data that can be used by a MIDI device. Once the images have been converted to recognizable notes and/or MIDI data, a user can then edit or modify the data quickly and easily. The extraction process allows a user to quickly scan and access complicated image data, without having to input the data manually one note or symbol at a time.

According to the above described embodiments, a relationship between the watching area extending in the main rasterizing scan direction and the line segment of a black pixel extending in the main rasterizing scan direction is examined and utilized. Therefore, high speed accessing to the image memory 1 is relatively easy so that higher speed processing can be realized over prior systems that extract images pixel by pixel rather than line segment by line segment.

Moreover, according to the invention, only a single connected component is detected at a time by a series of searches and the detected connected component is transferred from the object image memory 1 to the connected component image memory 3. Therefore, labelling of the individual pixels that form a connected component in the course of searching is not necessary. For this reason, the connected component image memory 3 only has to have the same storage capacity as the object image memory 1.

In the above described embodiment, a black pixel connected component of a binary image is extracted. The invention is applicable also to a case where a connected component of a pixel of a specific level of multi-valued image data other than binary image data is extracted.

The above-described processing may detect any part of object image data first. Also the detected image data may be not only a pixel but also a line segment extending in the main rasterizing scan direction.

In preferred embodiments of the present invention, after storing an extracted connected component into the second image memory, image recognition processing is performed with respect to the extracted connected component. Once the processing is completed, the connected component is recognized. After the extracted connected component in the second memory is recognized, the recognized connected component is erased from the second memory. Then the various processes use to detect, extract, and identify connected components are executed repeatedly until no further connected components are detected.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image processing device for extracting at least one connected component from binary image data so as to thereafter process the extracted connected component, wherein the binary image data designates pixels arranged in a main rasterizing scan direction and a sub-scanning direction perpendicular to the main rasterizing scan direction, each pixel is either black or white, and the connected component is composed of a contiguous group of black pixels, the image processing device comprising:

a first memory means for storing the binary image data;

a first means for searching the binary image data to detect a black pixel which is part of the connected component, wherein the black pixel detected by the first means is determined as a first watching area;

a second means for searching the binary image data to detect a line segment at least a part of which is included in the first watching area, the line segment being part of the connected component and consisting of all contiguous black pixels that extend in the main rasterizing scan direction;

a third means for canceling data of the detected line segment from the binary image data in the first memory means;

a fourth means for storing the data of the detected line segment in a second memory means as a part of object image data to be extracted as the connected component;

a fifth means for determining two next watching areas, one of the next watching areas being adjacent to the detected line segment in the sub-scanning direction and the other of the next watching areas being adjacent to the detected line segment in a direction that is 180° opposite to the sub-scanning direction, each of the next watching areas containing at least as many pixels as the detected line segment;

a sixth means for searching the binary image data to detect at least one line segment at least a part of which is included in one of the next watching areas, the line segment being part of the connected component and consisting of all contiguous black pixels that extend in the main rasterizing scan direction;

a seventh means for canceling data of each line segment detected by the sixth means from the binary image data in the first memory means;

an eighth means for storing data of each line segment detected by the sixth means in the second memory means, while maintaining the position of each detected line segment with respect to any previously-detected line segments;

a ninth means for determining next watching areas that include one next watching area adjacent to each line segment detected by the sixth means in the sub-scanning direction and another next watching area adjacent to each line segment detected by the sixth means in a direction that is 180° opposite to the sub-scanning direction, each of the next watching areas that are determined for one of the line segments detected by the sixth means containing at least as many pixels as the corresponding detected line segment; and a tenth means for repeatedly operating the sixth, seventh, eighth, and ninth means until the sixth means does not detect any line segment at least a part of which is included in one of the next watching areas.

2. An image processing device as defined in claim 1, wherein the image data comprises binary data including a plurality of black pixels, and the first means includes a black pixel search section which searches the binary image data from an initial address and continues searching in the main rasterizing scan direction to detect a black pixel which occurs first and determines the black pixel which occurs first as the first watching area.

3. An image processing device as defined in claim 1, wherein said next watching area of the binary image data to be searched is an area having a length that is at least one pixel longer in the main rasterizing scan direction than the detected and canceled line segment.

4. An image processing device as defined in claim 1, wherein the line segment detected by the second means is located at a position in the first memory means and the detected line segment is stored in the second memory means in a corresponding position.

5. The image processing device as defined in claim 1, wherein the main rasterizing scan direction is horizontal and the sub-scanning direction is vertical.

6. The image processing device as defined in claim 1, further comprising an eleventh means for further processing each extracted connected component stored in the second memory means, the eleventh means performing at least one of character recognition or pattern recognition.

7. A device for extracting line segment-by-line segment at least one connected component from binary image data stored in a storage means, so as to thereafter process the extracted connected component, the binary image data representing pixels arranged in a main rasterizing scan direction and a sub-scanning direction perpendicular to the main rasterizing scan direction, the connected component being composed of a contiguous group of black pixels, the device comprising:

watching area determining means for detecting a part of the connected component and for identifying the detected part of the connected component as a watching area;

segment detecting means for detecting a line segment at least a part of which is within the watching area, the detected line segment consisting of all contiguous pixels that extend in the main rasterizing scan direction and are part of the connected component;

segment extracting means for canceling data of the line segment detected by said segment detecting means from the binary image data, and for outputting the detected line segment as a part of the connected component to be extracted;

watching area changing means for changing the watching area to next watching areas that include one next watching area adjacent to the detected line segment in the sub-scanning direction and another next watching area adjacent to the detected line segment in a direction that is 180° opposite to the sub-scanning direction, each of the next watching areas extending in the main rasterizing scan direction and being at least as long as the detected line segment; and means for repeatedly operating the segment detecting means, the segment extracting means, and the watching area changing means until the segment detecting means does not detect any line segment at least a part of which is within the watching area, so that one connected component is extracted at a time and canceled from the binary image data.

8. The device as defined in claim 7, wherein the main rasterizing scan direction is horizontal and the sub-scanning direction is vertical.

9. The device as defined in claim 7, further comprising a connected component processing means for further processing each extracted connected component, the connected component processing means performing at least one of character recognition or pattern recognition.

10. A method for extracting at least one connected component from binary image data stored in a storage area, the connected component being composed of a contiguous group of black pixels and the binary image data being arranged in a main rasterizing scan direction and a sub-scanning direction perpendicular to the main rasterizing scan direction, the method comprising the steps of:

detecting a part of the connected component;

identifying the detected part of the connected component as a watching area;

detecting a line segment at least a part of which is within the watching area, the detected line segment being all contiguous pixels extending in the main rasterizing scan direction that are part of the connected component;

canceling data of the detected line segment from the binary image data;

outputting the detected line segment as part of the connected component to be extracted;

changing the watching area to next watching areas that include one next watching area adjacent to the detected line segment in the sub-scanning direction and another next watching area adjacent to the detected line segment in a direction that is 180° opposite to the sub-scanning direction, each of the next watching areas containing at least as many pixels as the detected line segment and being arranged in the main rasterizing scan direction; and repeating the steps of detecting, canceling, outputting, and changing until no line segment at least a part of which is within the next watching areas comes to be detected.

11. The method for extracting at least one connected component from binary image data as defined in claim 10, wherein the main rasterizing scan direction is horizontal and the sub-scanning direction is vertical.

12. The method for extracting at least one connected component from binary image data as defined in claim 10, further comprising the step of further processing each extracted connected component, the further processing including performing at least one of character recognition or pattern recognition.

13. A method for extracting connected components from binary image data so as to thereafter process the extracted connected components, wherein each connected component is composed of a group of all contiguous black pixels, the binary image data represents pixels arranged in a main rasterizing scan direction and a sub-scanning direction perpendicular to the main rasterizing scan direction, the method comprising the steps of:

storing the binary image data;

extracting a first connected component from the binary image data using a line segment-by-line segment extraction process that includes:

searching the binary image data to detect a black pixel that is part of the first connected component;

determining the detected black pixel as a first watching area;

searching the binary image data to detect a line segment at least a part of which is included in the first watching area, the detected line segment containing all contiguous black pixels extending in the main rasterizing scan direction and being part of the first connected component;

canceling data of the detected line segment from the binary image data;

storing the data of the detected line segment separately from the binary image data as a part of the first connected component;

forming a first next watching area adjacent to the detected line segment in the sub-scanning direction, the first next watching area containing at least as many pixels as the detected line segment;

forming a second next watching area adjacent to the detected line segment in a direction that is 180° opposite to the sub-scanning direction, the second next watching area containing at least as many pixels as the detected line segment;

searching the binary image data to detect at least one other line segment at least a part of which is included in at least one of the first and second next watching areas, the detected other line segment containing all contiguous black pixels extending in the main rasterizing scan direction and being a part of the first connected component that is adjacent to the previously-detected line segment canceling data of the detected other line segment from the binary image data;

storing the data of the detected other line segment while maintaining the position thereof in relation to the previously-detected line segment;

forming a first next watching area adjacent to the detected other line segment in the sub-scanning direction, the first next watching area containing at least as many pixels as the detected other line segment;

forming a second next watching area adjacent to the detected other line segment in a direction that is 180° opposite to the sub-scanning direction, the second next watching area containing at least as many pixels as the detected other line segment; and repeatedly executing the previous five steps of searching, canceling, storing, and forming first and second next watching areas until no other line segment at least a part of which is included in the next watching areas is detected; and after extraction of the first connected component is completed, extracting a second connected component from the binary image data using the line segment-by-line segment extraction process.

14. The method for extracting at least one connected component from binary image data as defined in claim 13, wherein the main rasterizing scan direction is horizontal and the sub-scanning direction is vertical.

15. A method for extracting at least one connected component from image data, wherein the image data represents pixels arranged in a main rasterizing scan direction and a sub-scanning direction perpendicular to the main rasterizing scan direction, the image data is stored in a first memory, each pixel has a value, and the connected component is composed of adjacent pixels having a predetermined value, said method comprising the steps of:

finding a first pixel having the predetermined value;

identifying a line segment containing the found pixel;

canceling the line segment from the first memory;

storing the line segment in a second memory as part of the connected component;

searching each pixel adjacent to the line segment in the sub-scanning direction and in a direction that is 180° opposite to the sub-scanning direction to find adjacent pixels that also have the predetermined value; and repeating the steps of identifying, canceling, storing, and searching for each found adjacent pixel having the predetermined value until no adjacent pixels having the predetermined value are found, so that only one connected component is extracted at a time and transferred from the first memory to the second memory.

16. The method for extracting at least one connected component from image data as defined in claim 15, wherein the image data consists of binary data so that each pixel has a value of either "0" or "1".

17. The method for extracting at least one connected component from image data as defined in claim 16, wherein the predetermined value is a value of "1".

18. The method for extracting at least one connected component from image data as defined in claim 15, further comprising the step of further processing each extracted connected component as stored in the second memory through at least one of character recognition processing or pattern recognition processing.

19. The method for extracting at least one connected component from image data as defined in claim 15, wherein each line segment is a group of all contiguous pixels extending in the main rasterizing scan direction that have the predetermined value, such that if there are two or more contiguous pixels extending in the main rasterizing scan direction that have the predetermined value, the two or more contiguous pixels are part of the same line segment.

20. The method for extracting at least one connected component from image data as defined in claim 15, wherein the searching step includes the sub-steps of:

determining watching areas that include one watching area adjacent to the line segment in the sub-scanning direction and another watching area adjacent to the line segment in the direction that is 180° opposite to the sub-scanning direction, each of the determined watching areas containing at least as many pixels as the corresponding line segment; and searching the watching areas to find adjacent pixels that also have the predetermined values.

21. A method for extracting at least one connected component from image data, wherein the image data represents pixels arranged in a main rasterizing scan direction and a sub-scanning direction perpendicular to the main rasterizing scan direction, the image data is stored in a first memory, each pixel has a value, the connected component is composed of adjacent pixels having a predetermined value, and the connected component is extracted line segment-by-line segment, each line segment being all contiguous pixels extending in the main rasterizing scan direction that have the predetermined value, said method comprising the steps of:

searching for a first pixel that has the predetermined value;

forming a line segment that includes the first pixel;

canceling the line segment from the first memory;

storing the line segment in a second memory as part of the connected component;

forming a first watching area, a watching area being one or more contiguous pixels extending in the main rasterizing scan direction that are part of the connected component if they have the predetermined value, the first watching area consisting of each pixel that is adjacent to a pixel in the line segment in the sub-scanning direction;

forming a second watching area consisting of each pixel that is adjacent to a pixel in the line segment in a direction that is 180° opposite to the sub-scanning direction;

placing the first and second watching areas on a stack to be later searched;

retrieving a watching area from the stack and making it the present watching area;

searching in the present watching area to find each line segment that has at least one pixel in the present watching area, and for each line segment found, repeating the steps of canceling, storing, forming a first watching area, forming a second watching area, and placing the first and second watching areas on the stack; and retrieving a watching area from the stack, making it the present watching area, and repeating the previous step, until the stack does not contain any watching areas.

22. The method for extracting at least one connected component from image data as defined in claim 21, wherein the image data consists of binary data so that each pixel has a value of either "0" or "1".

23. The method for extracting at least one connected component from image data as defined in claim 22, wherein the predetermined value is a value of "1".

24. The method for extracting at least one connected component from image data as defined in claim 23, wherein the image data includes a representation of a musical score and the extracted connected components stored in the second memory are further processed to produce MIDI data corresponding to the musical score.

25. The method for extracting at least one connected component from image data as defined in claim 23, wherein the main rasterizing scan direction is left-to-right, and the sub-scanning direction is up-to-down.

26. The method for extracting at least one connected component from image data as defined in claim 21, wherein the main rasterizing scan direction is left-to-right, and the sub-scanning direction is up-to-down.

27. The method for extracting at least one connected component from image data as defined in claim 21, wherein the step of searching for a first pixel comprises:

making an initial pixel a present pixel, determining the value of the present pixel;

if the present pixel does not have the predetermined value, making a next pixel the present pixel, the next pixel being an adjacent pixel in the main rasterizing scan direction as long as such a pixel exists, if there is no adjacent pixel in the main rasterizing scan direction, the next pixel is a pixel in the sub-scanning direction; and repeating the previous two steps until a pixel having the predetermined value is found.

28. The method for extracting at least one connected component from image data as defined in claim 21, wherein the step of forming a line segment that includes the first pixel comprises:

making the first pixel a part of the line segment;

determining the value of an adjacent pixel in the main rasterizing scan direction;

making the adjacent pixel part of the line segment if the adjacent pixel has the predetermined value; and repeating the previous two steps until the adjacent pixel does not have the predetermined value or there is no adjacent pixel in the main rasterizing scan direction.

29. The method for extracting at least one connected component from image data as defined in claim 21, wherein in the steps of forming a first watching area and forming a second watching area, each formed watching areas includes pixels that are only diagonally adjacent to a pixel in the line segment.

30. The method for extracting at least one connected component from image data as defined in claim 21, wherein in the steps of forming a first watching area and forming a second watching area, each formed watching area does not include pixels that are only diagonally adjacent to a pixel in the line segment, thereby making each formed watching area have the same number of pixels as the number of pixels in the line segment.

31. The method for extracting at least one connected component from image data as defined in claim 21, further comprising the step of further processing each extracted connected component stored in the second memory through at least one of character recognition processing or pattern recognition processing.

32. A method for extracting at least one connected component from a physical image, wherein image data represents pixels arranged in a main rasterizing scan direction and a sub-scanning direction perpendicular to the main rasterizing scan direction, each pixel has a value, the connected component is composed of adjacent pixels having a predetermined value, and the connected component is extracted line segment-by-line segment, each line segment containing all contiguous pixels extending in the main rasterizing scan direction that have the predetermined value, said method comprising the steps of scanning a physical image to determine the value of each pixel in the image data so that the image data corresponds to the content of the physical image;

storing the image data in a first memory;

searching for a first pixel that has the predetermined value;

forming a line segment that includes the first pixel;

canceling the line segment from the first memory;

storing the line segment in a second memory as part of the connected component;

forming a first watching area, a watching area being one or more contiguous pixels extending in the main rasterizing scan direction that are part of the connected component if they have the predetermined value, the first watching area consisting of each pixel that is adjacent to a pixel in the line segment in the sub-scanning direction;

forming a second watching area consisting of each pixel that is adjacent to a pixel in the line segment in a direction that is 180° opposite to the sub-scanning direction;

placing the first and second watching areas on a stack to be later searched;

retrieving a watching area from the stack and making it the present watching area;

searching in the present watching area to find each line segment that has at least one pixel in the present watching area, and for each line segment found, repeating the steps of canceling, storing, forming a first watching area, forming a second watching area, and placing the first and second watching areas on the stack; and retrieving a watching area from the stack, making it the present watching area, and repeating the previous step, until the stack does not contain any watching areas.

33. The method for extracting at least one connected component from image data as defined in claim 32, wherein the image data consists of binary data so that each pixel has a value of either "0" or "1", and the predetermined value is a value of " 1".

34. The method for extracting at least one connected component from image data as defined in claim 33, wherein the physical image includes a musical score and the extracted connected components stored in the second memory are further processed to produce MIDI data corresponding to the musical score.

35. A computer-readable medium encoded with a program for extracting at least one connected component from image data, wherein the image data represents the contents of an image and consists of data of a plurality of pixels that are arranged in a main rasterizing scan direction and a sub-scanning direction perpendicular to the main rasterizing scan direction, the connected component is composed of adjacent pixels having a predetermined data value, and the connected component is extracted line segment-by-line segment through the use of watching areas, each line segment being all contiguous pixels extending in the main rasterizing scan direction that have the predetermined data value, and each watching area consisting of one or more contiguous pixels extending in the main rasterizing scan direction, said program containing instructions for performing the steps of:

searching for at least a first pixel that has the predetermined data value;

forming a line segment that includes the first pixel;

canceling the line segment from the image data;

outputting the line segment as part of the connected component;

forming a first watching area, the first watching area consisting of each pixel that is adjacent to a pixel in the line segment in the sub-scanning direction;

forming a second watching area consisting of each pixel that is adjacent to a pixel in the line segment in a direction that is 180° opposite to the sub-scanning direction;

placing the first and second watching areas on a stack;

retrieving a watching area from the stack and making it the present watching area;

searching in the present watching area to find each line segment that has at least one pixel in the present watching area, and for each line segment found, repeating the steps of canceling, outputting, forming a first watching area, forming a second watching area, and placing the first and second watching areas on the stack; and retrieving a watching area from the stack, making it the present watching area, and repeating the previous step, until the stack does not contain any watching areas.

36. The computer-readable medium encoded with program for extracting at least one connected component from image data as defined in claim 35, wherein the image data is binary data so that each pixel has a value of either "0" or "1".

37. The computer-readable medium encoded with program for extracting at least one connected component from image data as defined in claim 36, wherein the predetermined data value is a value of "1".

38. The computer-readable medium encoded with program for extracting at least one connected component from image data as defined in claim 37, wherein the image contains a musical score and the extracted connected components are further processed to produce MIDI data corresponding to the musical score.

* * * * *